United States Patent [19]

Rowlett

[11] Patent Number: 5,314,029
[45] Date of Patent: May 24, 1994

[54] PYRAMIDAL SHAPED, HARDENED INSERT FOR AN AGRICULTURAL TOOL

[75] Inventor: Don C. Rowlett, Bedford, Pa.
[73] Assignee: Kennametal Inc., Latrobe, Pa.
[21] Appl. No.: 898,631
[22] Filed: Jun. 15, 1992
[51] Int. Cl.⁵ .................................................. A01C 23/00
[52] U.S. Cl. ..................................... 172/699; 172/747; 172/770; 172/772; 111/123
[58] Field of Search ............... 111/120, 123, 149, 156; 172/681, 699, 713, 719, 747, 749, 772, 772.5, 770; 175/426, 435; 299/79, 91, 94; 37/141 R, 142 R, 141 T

[56] References Cited

U.S. PATENT DOCUMENTS

| | | | |
|---|---|---|---|
| D. 237,644 | 11/1975 | Williams | D39/1 R |
| 1,891,222 | 12/1932 | Cornett | 299/94 |
| 2,302,069 | 11/1942 | Stephens | 299/94 |
| 2,847,921 | 8/1958 | Heckathorn | 172/699 |
| 2,904,119 | 9/1959 | Hunter | 111/123 X |
| 3,268,259 | 8/1966 | Snipe | 299/91 |
| 3,268,260 | 8/1966 | Snipe | 299/91 |
| 3,294,181 | 12/1966 | Binder | 111/123 X |
| 3,388,757 | 1/1968 | Fittinger | 175/426 |
| 3,848,931 | 11/1974 | Swisher | 299/94 |
| 3,919,951 | 11/1975 | Williams | 111/7 |
| 4,132,181 | 1/1979 | Smith et al. | 111/7 |
| 4,269,274 | 5/1981 | Robertson et al. | 172/713 X |
| 4,359,335 | 11/1982 | Garner | 299/78 X |
| 4,711,503 | 12/1987 | Berchem et al. | 37/142 R X |
| 4,719,862 | 1/1988 | Edmisson | 111/123 |
| 4,750,440 | 6/1988 | Pollard et al. | 111/62 |
| 4,765,261 | 8/1988 | Kaneko | 111/123 |
| 4,981,328 | 1/1991 | Stiffler et al. | 299/79 |

FOREIGN PATENT DOCUMENTS 1112446 5/1968 United Kingdom .................. 299/79

Primary Examiner—Clifford D. Crowder
Assistant Examiner—Ismael Izaguirre
Attorney, Agent, or Firm—John J. Prizzi; Larry R. Meenan

[57] ABSTRACT

A self-sharpening pyramidal shaped insert of a refractory hard metal for use as a leading penetrating element of a soil opener member of an agricultural tool. The insert includes a boss member of a generally frustoconical shape including a circular bottom and outwardly curved side surface extending upwardly from the circular bottom and terminating in a flange, and a penetrating tip having four nonparallel triangular sides, each triangular side having a common leg with a bordering triangular side and a third leg contiguous the flange. The triangular sides converge to a common vertex. The insert inhibits wear of the agricultural tool and contributes to proper soil flow as the agricultural tool cuts a slice in the soil.

17 Claims, 2 Drawing Sheets

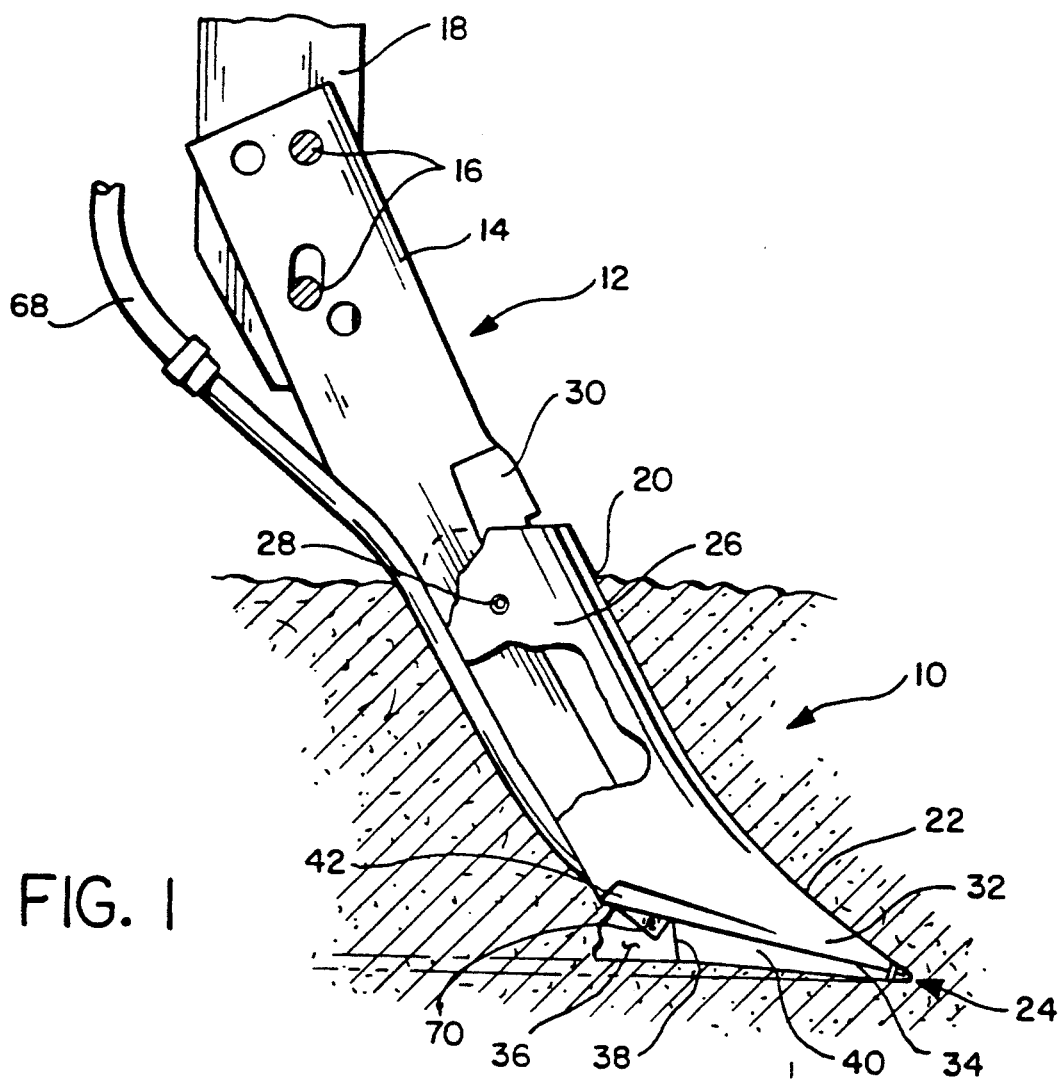
FIG. 1
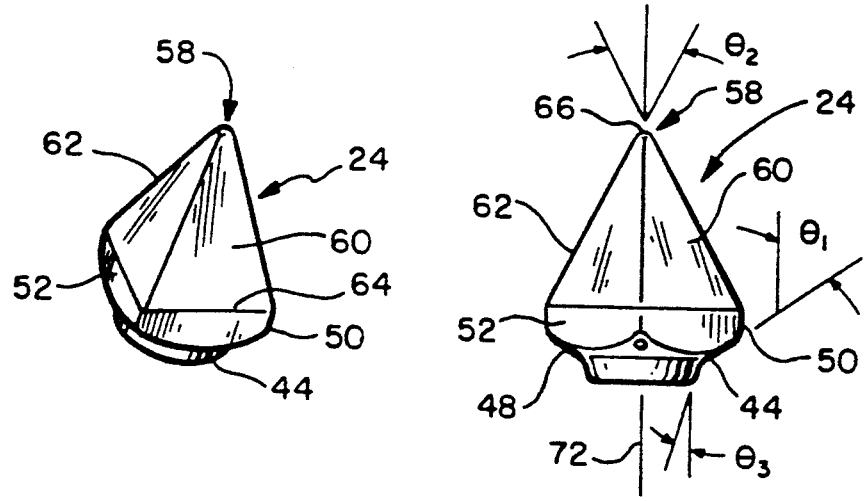
FIG. 2
FIG. 3

PYRAMIDAL SHAPED, HARDENED INSERT FOR AN AGRICULTURAL TOOL

1. FIELD OF THE INVENTION

This invention relates to subsoil penetrating agricultural tools. More particularly, this invention relates to self-sharpening hard wear resistant inserts made of a refractory hard metal for use as a leading slicing member of subsoil penetrating agricultural tools such as agricultural fertilizer knife assemblies and hoe drill shoes.

2. BACKGROUND OF THE INVENTION

This invention is concerned with improving the performance of high wear agricultural tools which form furrows or slices in the soil such as agricultural fertilizer knife assemblies and hoe drill shoes.

Agricultural tools such as fertilizer knives and hoe drill shoes, more fully described in U.S. Pat. Nos. 3,919,951; 4,132,181 and 4,750,440, typically include a soil opener member. Depending upon the particular application, the soil opener member may be in the form of a shoe member or a hoe member capable of passing through the soil. The soil opener member, generally streamlined in configuration and having a pointed leading end, provides a furrow for the passage of substances such as fertilizers, herbicides, fungicides, seeds and the like to the subsoil beneath the surface of the ground.

In operation, as the soil opener member advances, the pointed leading end penetrates the subsoil and the slicing edge of the member neatly divides the subsoil providing a furrow or slice of a uniform symmetrical V-shape having firm smooth sidewalls. Because of the penetrating, smoothing and firming action rendered by the soil opener member, a very well defined V-shape furrow is formed in the subsoil so that material discharged through a tube following behind the soil opener member may be uniformly positioned within the furrow.

It will be appreciated that as the soil opener member advances within the subsoil, the soil opener member encounters various high wear objects such as high silica soil, rocks, debris and the like. These high wear objects have a tendency to blunt the point of the soil opener member thereby producing a furrow having uneven and/or rounded sidewalls full of loose clods of soil. Accordingly, any material which is placed in the furrow is necessarily placed in random orientation and/or in an inappropriate position. In addition, it will be appreciated that a soil opener member having a blunt leading end has a tendency to "bull doze" the soil producing random air cavities within the subsoil and compressing and compacting the soil thereby generally destabilizing the agricultural tool. In view of the foregoing, there is a significant need for an improved agricultural soil opener member that resists wear, is durable in construction, and is economical to manufacture.

To alleviate the aforementioned problems I have invented a novel self sharpening pyramidal shaped insert of a refractory hard metal for use as a leading penetrating and slicing element of an agricultural soil opener member for applying material beneath the surface of the ground. The insert of the present invention inhibits wear of the soil opener member thereby contributing to proper soil flow, V-shape furrow formation and improved material placement as the soil opener member slices a furrow in the subsoil.

SUMMARY OF THE INVENTION

Briefly according to this invention, there is provided a self-sharpening pyramidal shaped insert of a refractory hard metal for use as a leading penetrating element of a soil opener member of an agricultural tool. The insert includes a boss member of a generally frustoconical shape including a circular bottom and outwardly curved side surface extending upwardly from the circular bottom and terminating in a flange, and a penetrating tip having four nonparallel triangular sides. Each triangular side has a common leg with a bordering triangular side and a third leg contiguous the flange. The triangular sides converge to a common vertex. The flange may include bumps positioned about the periphery thereof and be of a shape having a perimeter composed of four planar side segments of equivalent length or the flange may be of a cylindrical shape. In addition, the four side segments each may have a scalloped bottom edge adjacent the curved side surface.

BRIEF DESCRIPTION OF THE DRAWINGS

Further features and other advantages of this invention will become clear from the following detailed description made with reference to the drawings in which:

FIG. 1 is a side elevational view of an applicator knife partially in section utilizing a soil opener in accordance with the present invention during advancement through subsoil;

FIG. 2 is an isometric view of an insert in accordance with the present invention;

FIG. 3 is a front view of the insert of FIG. 2;

DESCRIPTION OF THE PREFERRED EMBODIMENTS

Figure 4:
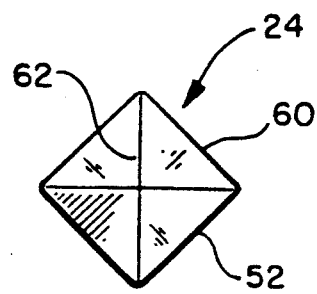
FIG. 4 is a top view of the insert of FIG. 2.
Figure 5:
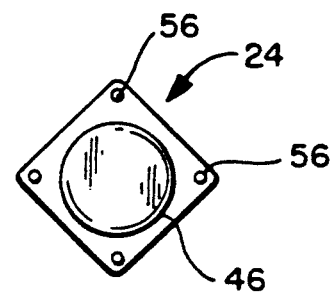
FIG. 5 is a bottom view of the insert of FIG. 2.
Figure 6:
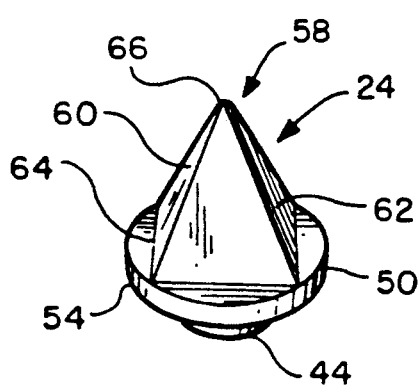
FIG. 6 is an isometric view of another embodiment of an insert in accordance with the present invention.

Referring to the drawings, wherein like reference characters represent like elements, FIG. 1 shows an embodiment of the present invention in connection with a soil opener member 10 for an agricultural fertilizer knife 12. The knife 12 includes an elongated shank 14 that may be attached at its upper end by pins 16 to a downwardly depending bracket 18 of an agricultural tool (not shown) and a soil opener member 10 that slips onto the lower end of the shank 14.

The soil opener member 10 is generally streamlined having an essentially "boot shape" configuration containing an upper boot section 20 and a depending lower shoe 22 including a leading self sharpening pyramidal shaped insert 24.

The upper boot section 20 of the soil opener member 10 includes two opposing converging convex faces 26 forming a generally U-shape cross-section defining an internal cavity open along its top end and rear for receiving the shank 14 within the cavity. A roll pin 28 may be forced through a pair of aligned openings in the upper boot section 20 of the soil opener member 10 and a hole in the shank 14 to removably hold the soil opener member attached to the shank, and an abutment 30 on shank 14 above the upper end of the soil opener member 10 precludes any swinging of the latter in one direction about the roll pin while the lower tip of the shank 14 precludes swinging of the soil opener member 10 in the opposite direction.

The shoe 22 of the soil opener member 10 is of a generally triangular cross-section having a pair of opposing convex faces 32 that converge from the back of the shoe toward the insert 24 and diverge downwardly from the top of the shoe to a generally flat bottom surface 34 such that soil opener member 10 cross-section progressively increases in width from the insert 24 rearward. The bottom surface 34 of soil opener member 10 is stepped having a recess 36 defined by a generally vertical surface forming a heel 38 and an upwardly inclined surface at the rearwardmost end of the soil opener. A lowermost slicing edge 40 extends longitudinally from the insert 24 to heel 38 along the center of the underside of the bottom surface 34 thereby defining a pair of elongated wings 42. The pair of wings 42 extend laterally outwardly from opposing faces 32 generally above the recess 36. Wings 42 progressively increase in width from the insert 24 rearward such that the lower extent of the wings defines the surface overlying recess 36.

The self-sharpening pyramidal shaped insert 24 is made by techniques known in the art of a refractory hard metal such as WC-Co grade 94 obtainable from Kennametal Inc. The insert 24 is secured, by brazing, within a complimentary shaped socket formed within the leading portion of the shoe 22 of the soil opener member 10.

Figure 7:
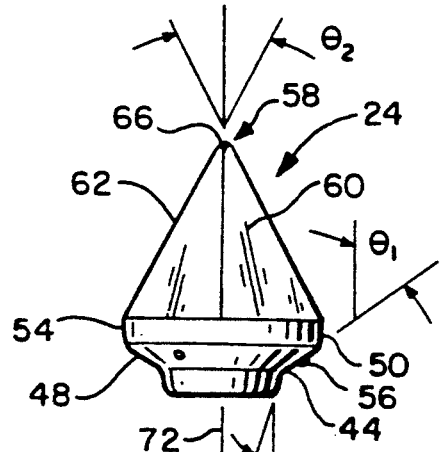
FIG. 7 is a front view of the insert of FIG. 6.
Figure 8:
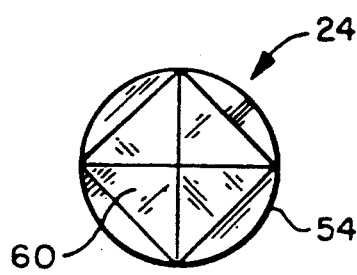
FIG. 8 is a top view of the insert of FIG. 6.
Figure 9:
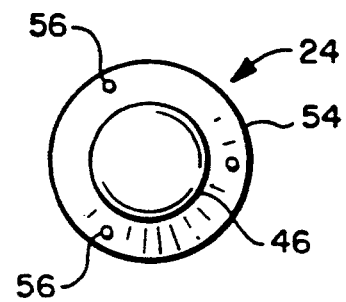
FIG. 9 is a bottom view of the insert of FIG. 6.

As shown in FIGS. 2-5 and FIGS. 6-9, the insert 24 includes a boss member 44 of a generally frustoconical shape having a circular bottom 46 and outwardly curved side surface 48 extending upwardly from the circular bottom and terminating in a flange 50. The flange 50 may be of a shape having a perimeter composed of four planar side segments 52 of equivalent length, FIGS. 2-5, or the flange may be of a generally cylindrical configuration 54, FIGS. 6-9. As shown in FIGS. 2-5, each of the four side segments 52 of the flange 50 may include a scalloped bottom edge adjacent the curved side surface 48. Bumps 56 may be provided on the flange 50 to provide for a braze joint of uniform thickness between the hard insert 24 and the complimentary socket. The outwardly curved side surface 48 of the boss member 44 is formed of a first and second surface angled with respect to a vertical central axis to form an angle of $\Theta_1$ and $\Theta_3$. In a preferred embodiment, $\Theta_1$ is approximately 25-45 degrees and more preferably 30 degrees and $\Theta_3$ is approximately 4-6 degrees and more preferably 5 degrees. A penetrating tip 58 having four nonparallel triangular planar sides 60 is formed integral with the boss member 44. Each triangular side 60 has a common leg 62 with a bordering triangular side and a third leg 64 contiguous the flange 50 and converging to a common vertex 66. As shown in FIGS. 3 and 7, opposing sides 60 of the pyramidal insert 24 form an angle $\Theta_2$ of approximately 45-90 degrees and preferably 55 degrees. The legs 62 of the triangular sides 60 are aligned with opposing wings 42 and slicing edge 40 to contribute to proper soil flow as the soil opener member 10 cuts a slice in the subsoil.

An elongated tube 68 may be fastened by any suitable means to the back of the soil opener member 10 extending downwardly from a source of supply (not shown) of a substance such as fertilizer and the like, terminating at its lowermost end slightly beyond wings 42 with a pair of lateral discharge outlets 70. The discharge outlets 70 of the tube are disposed within the recess 36 a short distance below the soil surface and behind the heel 38 in order to discharge the substance directly into the furrow or slice during operation of the agricultural tool.

In operation, the soil opener member 10 is oriented with the longitudinal axis of the soil opener member inclined slightly rearwardly from vertical. In this orientation the soil opener member 10 is inserted into the subsoil so that the top of the slice along the surface of the ground slightly trails the majority of the recess 36. As the knife 12 advances, the insert 24 divides the subsoil so that the remaining area of the soil opener member 10 can pass therethrough with a minimum of drag. As the slice is produced the sides of the insert 24 immediately engage the lowermost portions of the sides of the slice thereby progressively applying a firming and smoothing action to such portions to eliminate the existence of loose cloddy material and to assure that a V-shaped configuration is imparted to the lowermost portions of the slice. In addition, as the soil passes the triangular sides, the insert wears sharp thereby prolonging the effectiveness of the soil opener member 10. Due to the pyramidal shape of the insert 24, the sides of the slice are constantly neatly parted in contrast to the prior problem of "bulldozing" after prolonged use of the soil opener member 10 under hard wearing conditions.

The documents, patents and patent applications referred to herein are hereby incorporated by reference.

Having described presently preferred embodiments of the invention, it is to be understood that it may be otherwise embodied within the scope of the appended claims.

I claim:

1. A pyramidal shaped insert of a refractory hard metal for use as a leading penetrating element of an agricultural tool including a soil opener member useful for applying material beneath the surface of the ground, whereby said insert inhibits wear of the agricultural tool and contributes to proper soil flow as the soil opener member cuts a slice in the soil, said insert comprising:
   a) a boss member of a generally frustoconical shape including a circular bottom and an outwardly curved side surface extending upwardly from said circular bottom and terminating in a flange, and
   b) a penetrating tip having four nonparallel triangular sides, each triangular side having a common leg with a bordering triangular side and a third leg contiguous said flange, said triangular sides converging to a common vertex, such that the insert wears sharp as the soil passes the triangular sides and the leg of each triangular side contributes to proper soil flow as the soil opener member cuts a slice in the soil.

2. The insert of claim 1 wherein each of said triangular sides have a planar surface.

3. The insert of claim 2 further comprising bumps positioned about a periphery of said flange.

4. The insert of claim 2 wherein said flange is of a cylindrical shape.

5. The insert of claim 2 wherein said flange is of a shape having a perimeter composed of four planar side segments of equivalent length.

6. The insert of claim 5 wherein said four side segments each have a scalloped bottom edge adjacent the curved side surface.

7. The insert of claim 4 wherein said curved side surface includes a first and second surface angled with respect to vertical, said first surface forming an angle of between 25–45 degrees and said second surface forming an angle of between 4–6 degrees with respect to a vertical central axis of said insert.

8. The insert of claim 7 wherein said first surface is positioned at an angle of approximately 30 degrees.

9. The insert of claim 8 wherein said second surface is positioned at angle of approximately 5 degrees.

10. The insert of claim 7 wherein opposing triangular sides form an angle of between 45–90 degrees.

11. The insert of claim 7 wherein opposing triangular sides form an angle of approximately 55 degrees.

12. The insert of claim 1 wherein said refractory hard metal is WC-Co.

13. A pyramidal shaped insert of a refractory hard metal for use as a leading penetrating element of a soil opener member of an agricultural tool useful for applying material beneath the surface of the ground, whereby said insert inhibits wear of the agricultural tool and contributes to proper soil flow as the soil opener member cuts a slice in the soil, said insert comprising:

a) a boss member of a generally frustoconical shape including a circular bottom and an outwardly curved side surface extending upwardly from said circular bottom and terminating in a flange, wherein said flange is of a shape having a perimeter composed of four planar side segments of equivalent length, and b) a penetrating tip having four nonparallel triangular sides, each triangular side having a common leg with a bordering triangular side and a third leg contiguous a planar side segment of said flange, said triangular sides converging to a common vertex, such that the insert wears sharp as the soil passes the triangular sides and the leg of each triangular side contributes to proper soil flow as the soil opener member cuts a slice in the soil.

14. The insert of claim 13 wherein said refractory hard metal is WC-Co.

15. The insert of claim 14 wherein each of said triangular sides have a planar surface.

16. The insert of claim 15 further comprising bumps positioned about the periphery of said flange.

17. The insert of claim 16 wherein said four side segments each have a scalloped bottom edge adjacent the curved side surface.

* * * * *